(12) United States Patent
Miller

(10) Patent No.: US 8,028,413 B2
(45) Date of Patent: Oct. 4, 2011

(54) METHOD OF MAKING YTTRIA-STABILIZED ZIRCONIA RING

(75) Inventor: Glenn Miller, Lakewood, CA (US)

(73) Assignee: Stuller, Inc., Lafayette, LA (US)

( * ) Notice: Subject to any disclaimer, the term of this patent is extended or adjusted under 35 U.S.C. 154(b) by 720 days.

(21) Appl. No.: 12/034,575

(22) Filed: Feb. 20, 2008

(65) Prior Publication Data

US 2008/0197538 A1      Aug. 21, 2008

Related U.S. Application Data

(60) Provisional application No. 60/890,929, filed on Feb. 21, 2007.

(51) Int. Cl.
*A44C 27/00*     (2006.01)

(52) U.S. Cl. ............ 29/896.412; 29/8; 29/10; 29/896.4; 29/896.41; 63/15; D11/26; 419/10; 419/15

(58) Field of Classification Search .................. 29/8, 10, 29/896.412, 896.4, 896.41; 63/15; D11/26, D11/37, 39; 419/15; 524/198, 236; 523/1
See application file for complete search history.

(56) References Cited

U.S. PATENT DOCUMENTS

| | | | |
|---|---|---|---|
| 6,204,316 B1 * | 3/2001 | Schofalvi | 524/198 |
| 6,668,584 B1 | 12/2003 | Tosti | |
| 7,761,996 B2 * | 7/2010 | West | 29/896.412 |

* cited by examiner

*Primary Examiner* — Richard Chang
(74) *Attorney, Agent, or Firm* — Foley & Lardner LLP

(57) ABSTRACT

Various embodiments of the invention relate to a method for making an article of jewelry, the method may comprise, but is not limited to, mixing zirconia and a binder to form a mixture, heating the mixture, applying a pressure to the mixture to place the mixture in a mold to form a molded body, and applying heat to the molded body in a controlled atmosphere to at least partially remove the binder from the molded body. The method may further comprise forming at least one hole extending completely through the molded body, the at least one hole for inserting at least one stone setting or a housing for the stone setting.

12 Claims, 7 Drawing Sheets

| DIAMOND SIZE | OPTIMA DIAMOND SIZE RANGE | A - BOTTOM DIAMETER | | B - TOP DIAMETER | | C - TOP HEIGHT | | D - BOTTOM HEIGHT |
|---|---|---|---|---|---|---|---|---|
| 2 PT. | | 1.45mm | +0.02 -0.00 | 1.95mm | +0.02 -0.00 | 0.5mm | +0.05 -0.00 | |
| 3 PT. | 1.85 mm TO 2.00 mm | 1.95mm | +0.02 -0.00 | 2.45mm | +0.02 -0.00 | 0.6mm | +0.05 -0.00 | |
| 5 PT. & 6.5 PT. | 2.30 mm TO 2.50 mm | 2.25mm | +0.02 -0.00 | 2.95mm | +0.02 -0.00 | 0.7mm | +0.05 -0.00 | NOT APPLICABLE |

METHOD OF MAKING YTTRIA-STABILIZED ZIRCONIA RING

CROSS-REFERENCE TO RELATED PATENT APPLICATIONS

This application claims priority from Provisional Application U.S. Application 60/890,929, filed Feb. 21, 2007, incorporated herein by reference in its entirety.

BACKGROUND OF THE INVENTION

Ceramic materials are characterized by high strength and hardness, good wear resistance, heat and corrosion resistance, and brittleness. One class of ceramic materials includes zirconia ($ZrO_2$) ceramics. The properties of zirconia ceramics have been modified by adding varying amounts of oxides such as $Y_2O_3$ (yttria), MgO, or CaO to prepare stabilized zirconia. Embodiments of the present invention provide articles of jewelry prepared with zirconia or stabilized zirconia, and methods of making such jewelry.

SUMMARY OF THE INVENTION

Embodiments of the present invention provide an article of jewelry, such as a ring, bracelet, or necklace, in which at least a part of the article is made of a zirconia or yttria-zirconia ceramic material. In certain embodiments, the zirconia or yttria-zirconia article or part is characterized as having at least one hole, extending completely through the part, into which a stone mounted in a bezel or other housing is inserted.

Embodiments of the present invention also provide a method of using ceramic material to make an article of jewelry, including yttria-zirconia jewelry, a method of making insertion holes in ceramic jewelry articles, and a method of inserting a preset stone into a ceramic article of jewelry.

One embodiment of the invention relates to a method for making an article of jewelry, the method may comprise, but is not limited to, mixing zirconia and a binder to form a mixture, heating the mixture, applying a pressure to the mixture to place the mixture in a mold to form a molded body, and applying heat to the molded body in a controlled atmosphere to at least partially remove the binder from the molded body.

In various embodiments, the method may further comprise forming at least one hole extending completely through the molded body, the at least one hole for inserting at least one stone setting or a housing for the stone setting. In various embodiments, the at least one hole is formed in the molded body when the molded body is formed in the mold.

In various embodiments, the method may further comprise further drilling the at least one hole of the molded body to increase the diameter of the at least one hole of the molded body from an initial diameter to a finished diameter.

In some embodiments, the method may further comprise fitting the at least one stone setting or the housing for the stone setting into the at least one hole of the molded body.

In various embodiments, the finished diameter of the at least one hole of the molded body may be at least 1 millimeter larger than the initial diameter of the at least one hole of the molded body.

In various embodiments, the finished diameter of the at least one hole of the molded body may be of substantially the same size and dimension of the at least one stone setting or the housing for the stone setting. In some embodiments, a cross-section of the hole with the finished diameter of the molded body may be T-shaped.

In various embodiments, the binder comprises about 1 to 8 mol % of the mixture. In various embodiments, the molded body is an annular body. In various embodiments, the binder comprises at least one of yttria, magnesium oxide, and calcium oxide.

In some embodiments, the heat is applied according to a heat schedule.

In various embodiments, the method further comprises removing the molded body from the mold before applying the heat.

An article of jewelry in accordance with an embodiment of the present invention may include, but is not limited to, a body. The body may comprise zirconia and a binder. The body may be formed by mixing the zirconia and the binder to form a mixture, heating the mixture, applying a pressure to the mixture to place the mixture in a mold to form a molded body, and applying heat in a controlled atmosphere to at least partially remove the binder from the molded body to form the body. The body may have at least one hole extending completely through the body. The at least one hole may be for inserting at least one stone setting or a housing for the stone setting of substantially the same size and dimension of the at least one hole.

In various embodiments, the at least one hole of the body may be formed in the mold, and by further drilling the at least one hole of the body from an initial diameter to a finished diameter.

In various embodiments, the finished diameter of the at least one hole of the body may be at least 1 millimeter larger than the initial diameter of the at least one hole of the body.

In various embodiments, the finished diameter of the at least one hole of the body may be of substantially the same size and dimension of the at least one stone setting or the housing for the stone setting.

In various embodiments, a cross-section of the hole with the finished diameter of the body may be T-shaped. In various embodiments, the binder may comprise about 1 to 8 mol % of the mixture. In various embodiments, the molded body may be an annular body. In various embodiments, the binder may comprise at least one of yttria, magnesium oxide, and calcium oxide. In various embodiments, the heat may be applied according to a heat schedule.

DETAILED DESCRIPTION OF THE PREFERRED EMBODIMENTS

Figure 1:
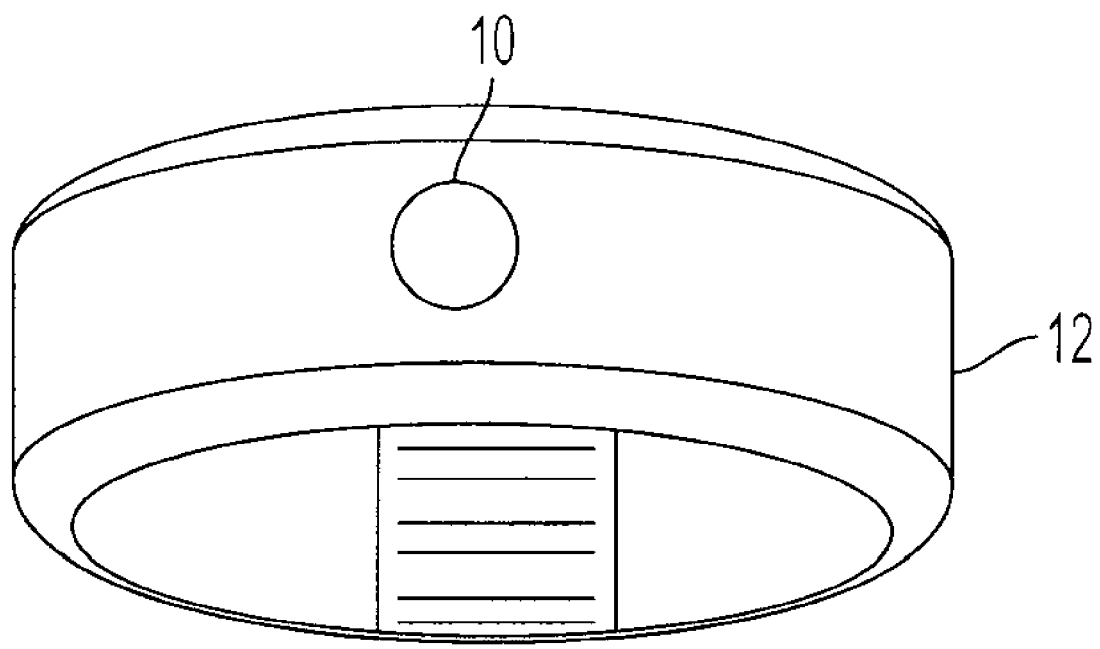
FIG. 1 illustrates a ring with a single setting.
Figure 2:
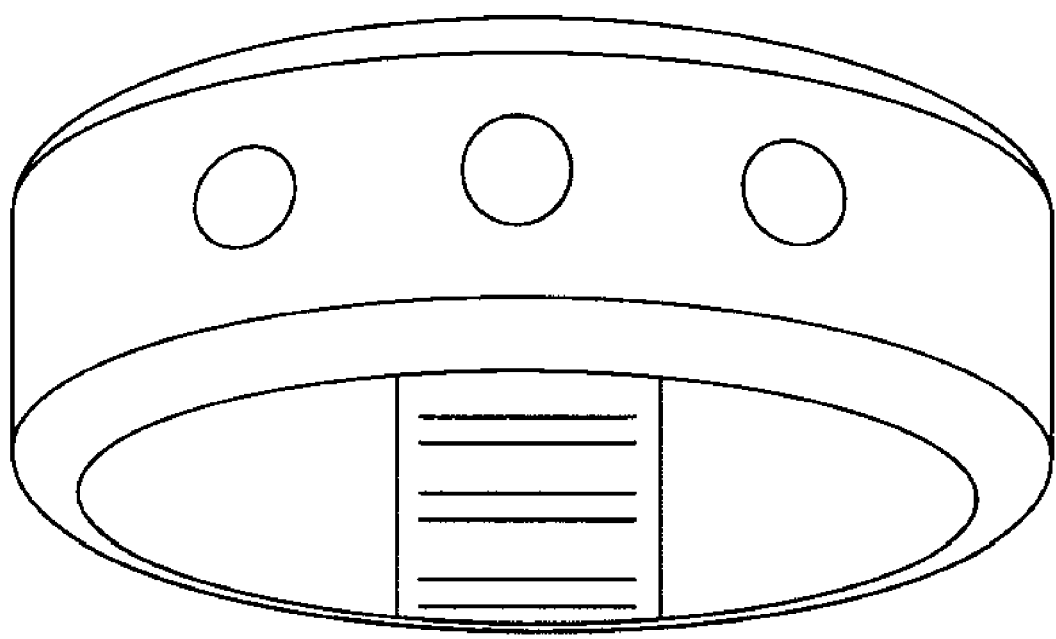
FIG. 2 illustrates a ring with three settings.

FIG. 1 shows a ring in accordance to an embodiment of the present invention. The ring contains a single stone setting 10 inserted into a hole ("insertion hole") in a ring band 12. The hole may extend completely through the ring band. The stone setting may comprise a semi-precious or precious stone, which in preferred embodiments is a diamond, and may include a bezel or other housing for the stone. As shown in FIG. 2, a ring may contain multiple holes, with each hole containing a setting.

In the embodiment shown in FIG. 1, the ring band may be made of zirconia. In general, the ring band may be made of zirconia based ceramics, such as those containing pure zirconia, substantially pure zirconia (>99.5 mol % zirconium dioxide), or an yttria-zirconia composite material containing, for example, about 5 mol % yttria and 95 mol % zirconia. In some embodiments, a ring band, with or without a hole and a setting, can be made of yttria-zirconia composites containing yttria in the range of about 1-8 mol % and zirconia in the range of about 92-99 mol %. Preferably, the mol % ratio of yttria to zirconia is less than or equal to 1:99, 2:98, 3:97, 4:96, 5:95, 6:94, 7:93, or 8:92. In certain embodiments, a dye or pigment well known in the art can be added to the yttria-zirconia composite, for color. The amount and type of dye or pigment depends on the desired color. Articles of jewelry according to this invention can also be prepared from other stabilized zirconia ceramics, such as MgO-stabilized or CaO-stabilized zirconia, and from other well known ceramic materials.

Although with rings made of relatively soft material, such as gold or silver, a hole can be prepared by drilling, precise drilling in ring bands made of ceramic materials results in breaking of the ring due to the brittleness of the ceramic. According to an embodiment of the present invention, a method of preparing an insertion hole in ceramic rings and other ceramic jewelry articles may be provided in which a roughly dimensioned insertion hole was made as part of the molding process, with the final dimensions obtained by drilling of the roughly dimensioned hole.

Figure 3:
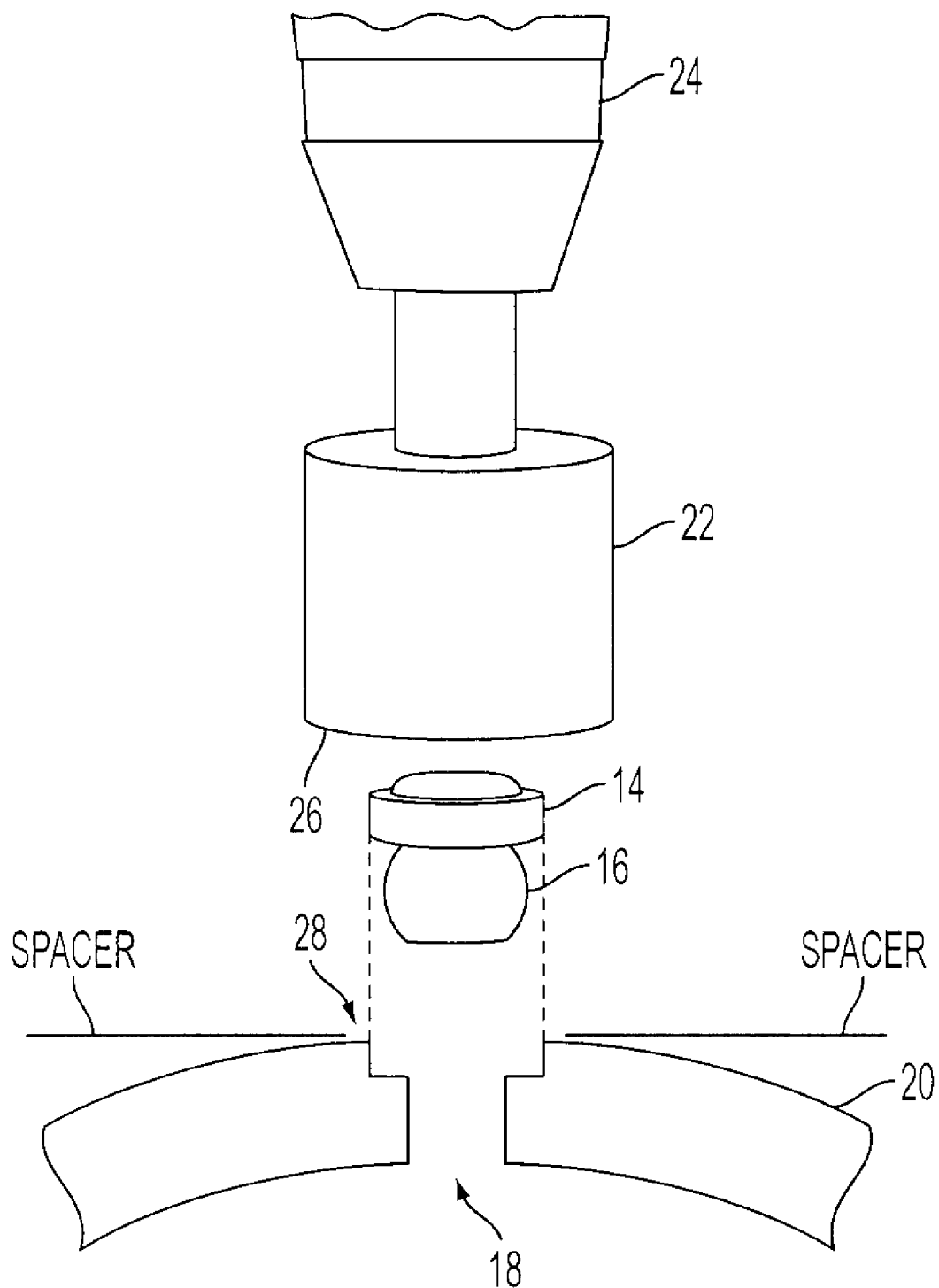
FIG. 3 is a schematic drawing of a method of inserting a stone setting into an insertion hole with an impact device.
Figure 4:
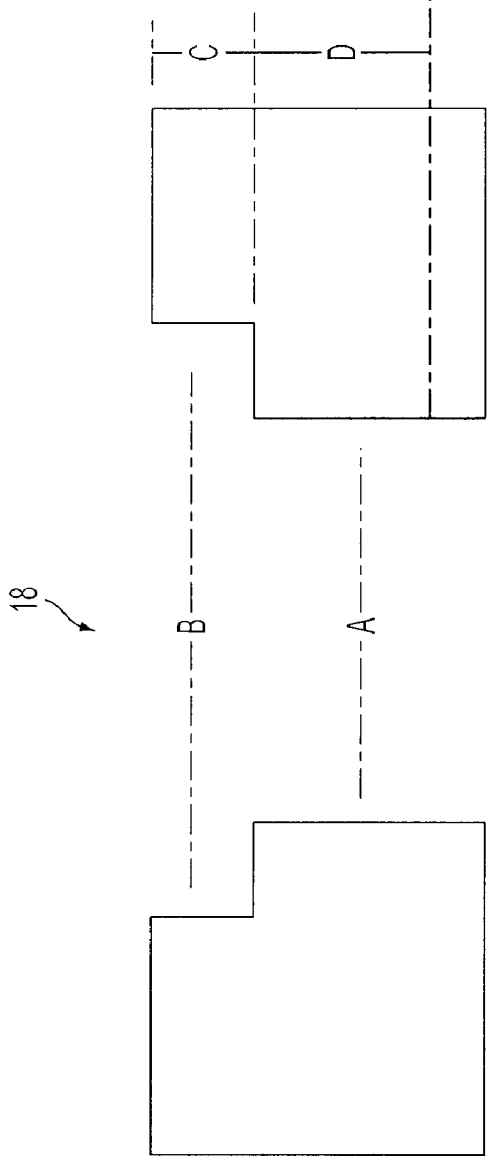
FIG. 4 provides examples of insertion hole specifications.

The shape of the insertion hole may be determined by the shape of the stone setting, and in particular, the shape of the bezel housing for the stone setting. The hole may be shaped such that a bezel-mounted stone setting can be press-fit into the hole and held fast by the force between the bezel surface and the wall of the hole without the need for solder, glue, or any other material. A bezel housing for setting a stone in a piece of jewelry by press fitting is described in U.S. Pat. No. 6,668,584 to Tosti, herein incorporated by reference. FIG. 3 shows one example of a stone setting set in such a housing. The stone setting may include an upper, disc shaped portion 14 for holding the stone, and a lower barrel-shaped tube portion 16. According to an embodiment of the present invention, a setting like the one described in the Tosti patent may be used in preferred embodiments. In the preferred embodiments, the insertion hole may be shaped like two co-axial discs of differing diameters, with the larger diameter disc on top of the smaller diameter disc. Thus, as shown in FIGS. 3 and 4, the insertion hole 18 in these embodiments may be characterized as "T-shaped" when viewed in cross-section parallel to the ring circumference. As FIG. 3 shows, the insertion hole 18 may extend completely through the ring band 20.

Examples of size specifications for insertion holes are provided in FIG. 4. In this figure, the diameter of the smaller diameter disc may be about 1.45 mm for a 0.02 pt diamond, about 1.95 mm for a 0.03 pt diamond, and about 2.25 mm for a 0.05-0.065 pt diamond. The specifications for other sized diamonds and holes may be proportionate to the specifications of the examples in FIG. 4.

To prepare yttria-zirconia rings such as those shown in FIGS. 1 and 2, 95 mol % zirconia (crystalline oxide) and 5% yttria may be mixed at normal room temperature. In this case, yttria may act as a binder. In other cases, a binder such as a nickel-based binder, a yeast-based binder, or other organic or inorganic binders well known in the art may be added. Next, the starting 5% yttria-95% zirconia mixture may be heated in the barrel of a molding machine until the temperature reaches 200° C. At this temperature, the viscosity of the mixture may be such that the mixture may flow when pressure is applied. The mixture may be then forced under pressure through an orifice in the barrel and into the tool cavity of a ring mold. A plunger or the like may be used to apply pressure. In some cases, the molded material may be removed from the die before proceeding to the next step; alternatively, the molded material may remain in the die. Next, the molded material (in or removed from the die) may be subject to a precise heating schedule in a controlled atmosphere to slowly remove ("burn out") the yttria binder from the yttria-zirconia mixture.

Figure 7:
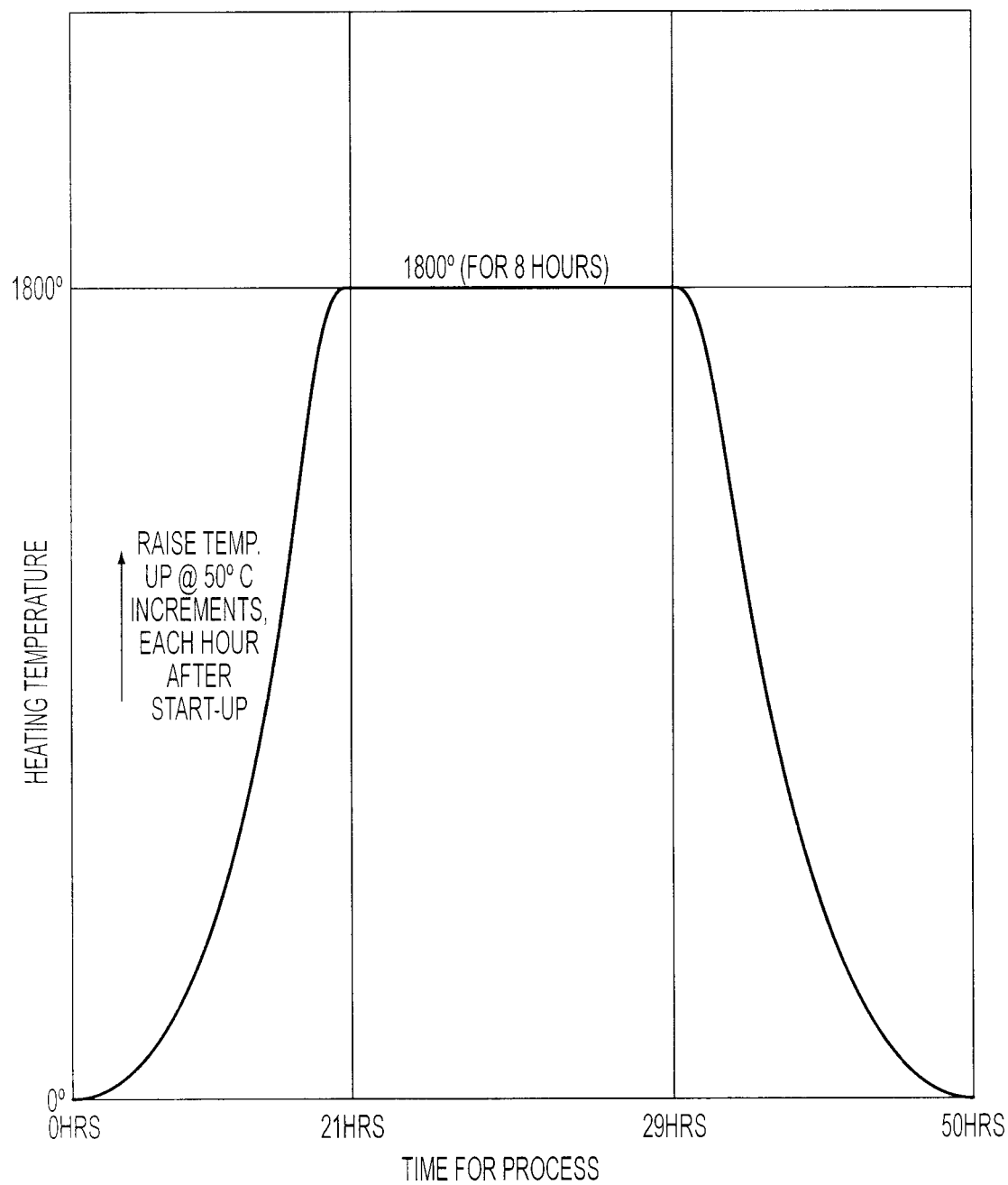
FIG. 7 is a graph showing schematically a heating schedule for an yttria-zirconia mixture.

The heating schedule may comprise heating the molded material from about 0° C. to about 1800° C. in a 21 hour period at increments of about 50° C. per hour. Upon reaching 1800° C., the material may be then heated at about 1800° C. for 8 hours. Finally, the temperature of the material may be decreased at intervals of about 50° C. per hour over a 21 hour period. FIG. 7 is a graph providing a schematic representation of the heating schedule according to an embodiment of the present invention. The molded material may be heated to temperatures of 1800° C. to sinter the zirconia based material. The heating schedule may be carried out in a vacuumized furnace or vacuumized oven, for example.

When the yttria-zirconia mixture ("powder") is molded and compacted, the "powder compact" may be usually around 50% of its final theoretical density. Full densification may be achieved by sintering at temperatures up to 1800° C. The sintering (or firing) process may provide energy for individual powder particles to bond together and decrease the porosity between the particles. During the sintering process, the ring may shrink by about 40 vol %. This shrinkage may be predictable and me be accommodated.

Because the yttria was burned out during the scheduled heating process, the resulting ceramic material may comprise less than the 5% yttria contained in the original yttria-zirconia mixture. In some cases, the yttria may be reduced such that the resulting ceramic material is pure zirconia, or substantially pure zirconia containing less than 0.5% yttria. In other cases, the amount of yttria remaining in the ceramic may be 0.5% or greater, but less than the original 5% in the starting mixture. The same may hold true for ceramic materials made from other combinations of yttria and zirconia. For example, yttria-zirconia starting mixtures containing yttria in the range of about 1-8 mol % and zirconia in the range of about 92-99 mol %, may result in zirconia based ceramic materials of pure or substantially pure zirconia, or containing yttria in an amount less than the original starting mixture. Thus, the mol % ratio of yttria to zirconia may be less than or equal to 1:99, 2:98, 3:97, 4:96, 5:95, 6:94, 7:93, or 8:92, after going through the scheduled heating process.

Figure 5:
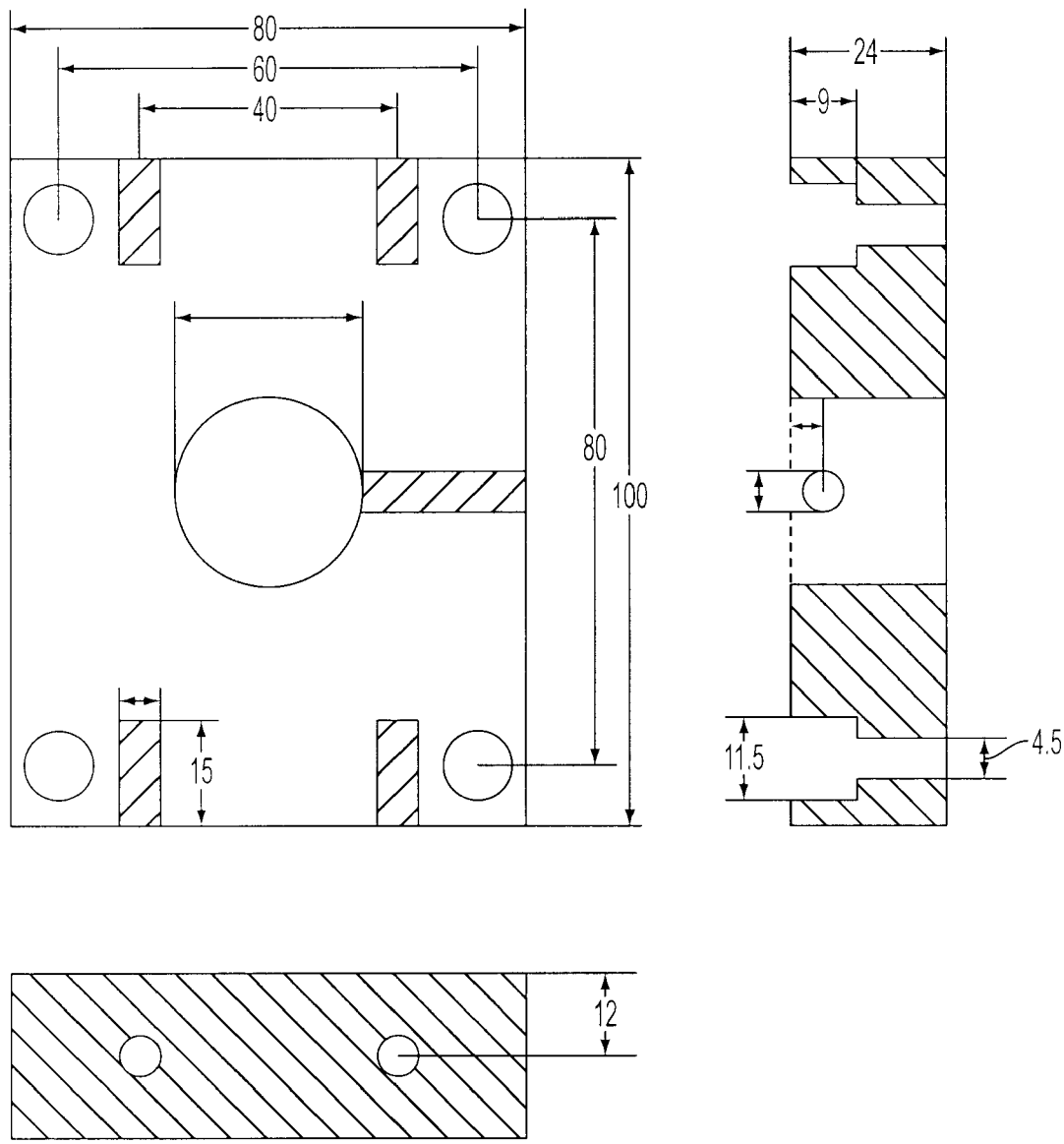
FIG. 5 is a schematic drawing of a mold for a ring having a single insertion hole.
Figure 6:
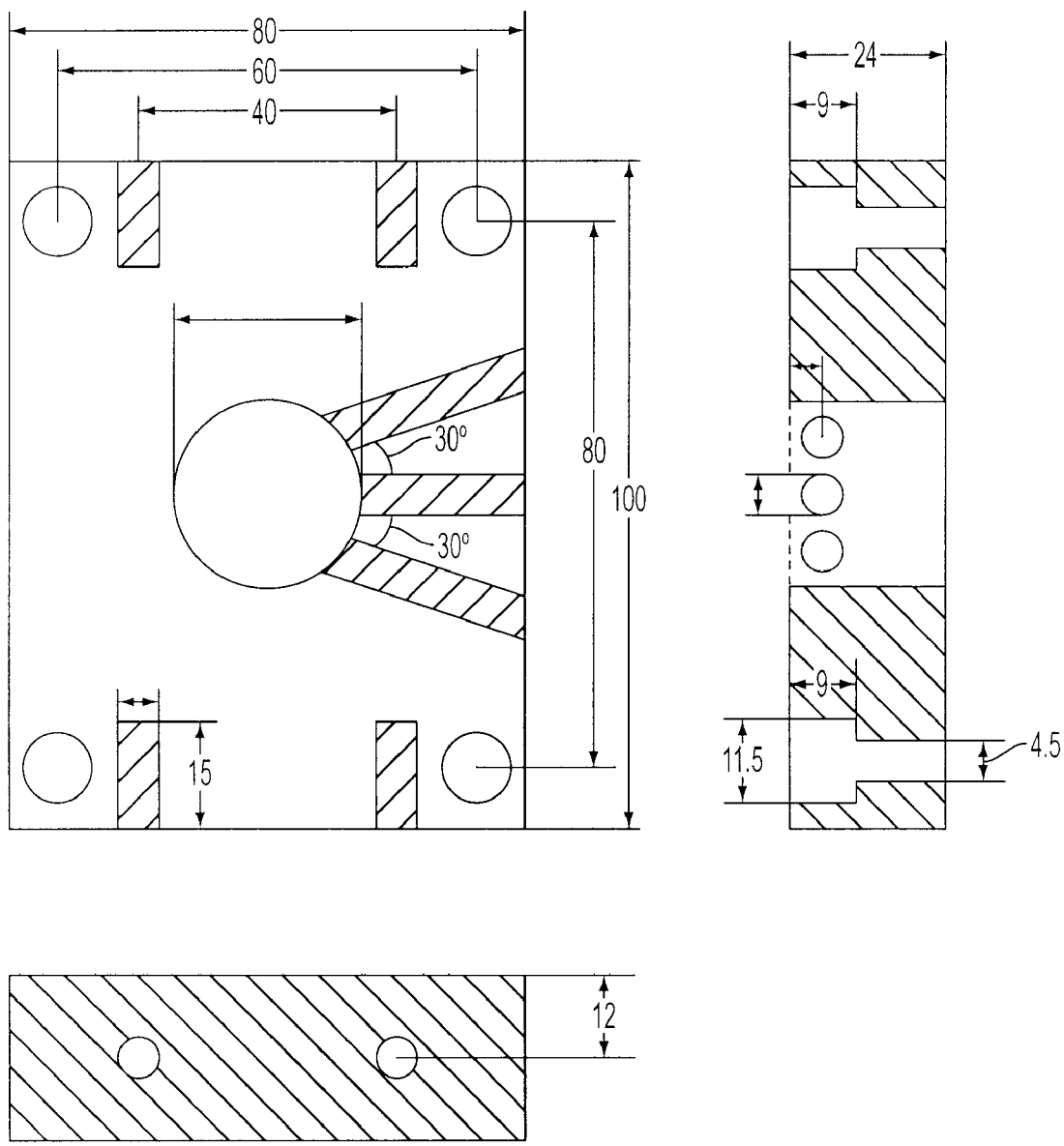
FIG. 6 is a schematic drawing of a mold for a ring having three insertion holes.

Insertion holes for the rings may be included in the ring molds and made as part of the molding process. For example, FIG. 5 shows a mold for preparing a ring having one insertion hole, and FIG. 6 shows a mold for preparing a ring having three insertion holes. The holes may be molded slightly smaller than the desired final hole dimensions. In particular embodiments, the holes created by molding may be smaller in diameter by at least about 0.1 mm than the desired final hole dimensions. For a "T-shaped" hole such as that shown in FIG. 4, the molded hole may include both the larger and smaller diameter openings ("co-axial discs"). Diamond drill bits and a CNC Machine (computer numerical control-type drilling machine) may be then used to "clean" or "perfect" the larger and smaller diameters to the desired dimensions, such as those provided in FIG. 4.

The method of molding the hole size smaller than the final desired dimensions, and then drilling to perfect the hole, may provide a hole of the appropriate size and dimensions to accept a bezel mounted stone. In some embodiments, molding alone may not provide a hole of exact dimensions, for example, due to expansion and contraction the molded hole endures during heating and sintering.

A stone setting similar to the setting described in the Tosti patent may be inserted into an insertion hole by any percussive action tool, such as a hammer. For example, a commercially available impact device (Unilock Impact Tool, Stone Set Technologies, Inc., Fort Lauderdale, Fla.) may be used. As shown in FIG. 3, the impact tool 22 may be set in a regular drill press 24, and the stone setting ("unilock") may be press fit into an insertion hole by first inserting the setting into the insertion hole by hand, and then pressing down on the setting with the impact tool. The impact tool surface 26 that contacts the stone setting may be flat in such an embodiment. Depending on the shape of a stone setting, other impact tool surface shapes, such as concave or convex, may be used so long as the setting can be fitted into the insertion hole without damaging the setting. The surface of the impact tool may comprise rubber, a polymer such as polyurethane, or another non-scratching material. As shown in FIG. 3, a spacer may be positioned around the setting after hand insertion, but before using the impact tool. The spacer may be made from a material such as paper or plastic, and can be from about 0.1 mm to about 0.2 mm in thickness. The spacer may comprise a single sheet of material of generally circular shape, and have one or more holes 28 with a shape, position, and a diameter for aligning with one or more settings. The spacer may facilitate the insertion of the stone setting straight into the insertion hole by the impact tool.

In practice, the impact tool may be positioned in a drill press. The ring may be held in a vice or similar device, which may be placed on a table of the drill press. The table height may be adjusted such that the impact tool would press the setting into an insertion hole to the correct depth, i.e., to a point where the setting was securely inserted into the hole. As shown in FIG. 3, for example, table height may be set at "high," "medium," or "low" for insertion of a 0.02 pt, 0.03 pt, or 0.05 pt diamond setting, respectively.

In practice, bezel-mounted diamonds were sorted into groups of similar size. In FIG. 3, for example, the first step in inserting the settings was to "use three pieces of the same group," i.e., three pieces grouped according to size.

What is claimed is:

1. A method for making an article of jewelry, the method comprising:
    mixing zirconia and a binder to form a mixture;
    heating the mixture;
    applying a pressure to the mixture to place the mixture in a mold to form a molded body;
    applying heat to the molded body in a controlled atmosphere; and
    forming at least one hole extending completely through the molded body, the at least one hole for inserting at least one stone setting or housing for a stone setting;
    wherein the at least one hole is formed in the molded body when the molded body is formed in the mold.

2. The method for making an article of jewelry according to claim 1, further comprising:
    further drilling the at least one hole of the molded body to increase the diameter of the at least one hole of the molded body from an initial diameter to a finished diameter.

3. The method for making an article of jewelry according to claim 2, further comprising:
    fitting the at least one stone setting or housing for a stone setting into the at least one hole of the molded body.

4. The method for making an article of jewelry according to claim 2,
    wherein the finished diameter of the at least one hole of the molded body is at least 1 millimeter larger than the initial diameter of the at least one hole of the molded body.

5. The method for making an article of jewelry according to claim 2,
    wherein the finished diameter of the at least one hole of the molded body is of substantially the same size and dimension of the at least one stone setting or housing for a stone setting.

6. The method for making an article of jewelry according to claim 2,
    wherein a cross-section of the hole with the finished diameter of the molded body is T-shaped.

7. The method for making an article of jewelry according to claim 6:
    wherein the finished diameter comprises a top finished diameter corresponding with the top of the T-shaped-hole and a bottom finished diameter corresponding with the bottom of the T-shaped hole; and
    wherein the top finished diameter is within a +0.02 mm tolerance, and the bottom finished diameter is within a +0.02 mm tolerance.

8. The method for making an article of jewelry according to claim 1,
    wherein the binder comprises about 1 to 8 mol % of the mixture.

9. The method for making an article of jewelry according to claim 1,
    wherein the molded body is an annular body.

10. The method for making an article of jewelry according to claim 1,
    wherein the binder comprises at least one of yttria, magnesium oxide, and calcium oxide.

11. The method for making an article of jewelry according to claim 1,
    wherein the heat is applied according to a heat schedule.

12. The method for making an article of jewelry according to claim 1, further comprising:
    removing the molded body from the mold before applying the heat.

* * * * *